US012744386B2

(12) United States Patent
Dahle et al.

(10) Patent No.: US 12,744,386 B2
(45) Date of Patent: Sep. 22, 2026

(54) PORTABLE POWER STATION, SYSTEM, AND METHOD THEREOF

(71) Applicant: North Atlantic Imports, LLC, Logan, UT (US)

(72) Inventors: Roger Dahle, Providence, UT (US); Jared M. Smith, Paradise, UT (US)

(73) Assignee: North Atlantic Imports, LLC, Providence, UT (US)

( * ) Notice: Subject to any disclaimer, the term of this patent is extended or adjusted under 35 U.S.C. 154(b) by 106 days.

(21) Appl. No.: 18/224,018

(22) Filed: Jul. 19, 2023

(65) Prior Publication Data

US 2024/0030711 A1 Jan. 25, 2024

Related U.S. Application Data

(60) Provisional application No. 63/391,705, filed on Jul. 22, 2022.

(51) Int. Cl.

| | |
|---|---|
| ***H02J 3/38*** | (2026.01) |
| ***A47J 37/06*** | (2006.01) |
| ***A47J 37/07*** | (2006.01) |
| ***F24C 7/10*** | (2021.01) |
| ***H02J 3/32*** | (2026.01) |
| ***H02J 7/02*** | (2016.01) |
| ***H02J 7/35*** | (2006.01) |
| ***H02J 7/82*** | (2026.01) |
| ***H02J 101/24*** | (2026.01) |

(52) U.S. Cl.

CPC ............. *H02J 3/32* (2013.01); *A47J 37/0676* (2013.01); *A47J 37/0709* (2013.01); *A47J 37/0763* (2013.01); *A47J 37/0786* (2013.01); *F24C 7/10* (2013.01); *H02J 3/38* (2013.01); *H02J 7/02* (2013.01); *H02J 7/35* (2013.01); *H02J 7/82* (2026.01); *H02J 2101/24* (2026.01); *H02J 2207/20* (2020.01)

(58) Field of Classification Search

CPC ........ H02J 3/32; H02J 3/38; H02J 7/02; H02J 7/0048

USPC .......................................................... 307/82

See application file for complete search history.

(56) References Cited

U.S. PATENT DOCUMENTS

| | | | |
|---|---|---|---|
| 4,442,828 | A | 4/1984 | Takeuchi et al. |
| 8,193,760 | B2 | 6/2012 | Wagnon et al. |
| D694,056 | S | 11/2013 | Dahle |
| 8,960,181 | B2 | 2/2015 | Lin |
| 10,327,589 | B1 | 6/2019 | Dahle et al. |

(Continued)

FOREIGN PATENT DOCUMENTS

| | | |
|---|---|---|
| CN | 103471270 | 12/2013 |

*Primary Examiner* — Rexford N Barnie
*Assistant Examiner* — Swarna N Chowdhuri
(74) *Attorney, Agent, or Firm* — David L. Stott

(57) ABSTRACT

Embodiments of a solar powered portable power station configured to be powered by a solar element and/or alternate energy source and method thereof are provided. The solar powered portable power station includes a portable cart structure with an upper support structure configured to support and position components being powered by the portable power station. The upper support structure of the portable cart structure configured to support and position an electric device, such as a portable cooking station or other appliance or a power tool, each of which may be powered by the portable power station.

20 Claims, 9 Drawing Sheets

(56) References Cited

U.S. PATENT DOCUMENTS

| | | | | |
|---|---|---|---|---|
| 10,371,328 | B2 | 8/2019 | Poage | |
| 11,311,147 | B2 | 4/2022 | Dahle | |
| 2011/0057512 | A1 | 3/2011 | Prax et al. | |
| 2012/0145144 | A1 | 6/2012 | Lin | |
| 2012/0182670 | A1 | 7/2012 | Prax et al. | |
| 2012/0263845 | A1 | 10/2012 | Shi | |
| 2015/0044345 | A1 | 2/2015 | Sherwin | |
| 2015/0061568 | A1* | 3/2015 | Martinez | H02S 20/30 136/246 |
| 2016/0161150 | A1 | 6/2016 | Zintel et al. | |
| 2017/0047770 | A1* | 2/2017 | Imperial | H02J 7/35 |
| 2019/0036359 | A1* | 1/2019 | Smith | H02J 7/731 |
| 2020/0116393 | A1 | 4/2020 | Lin et al. | |
| 2020/0252022 | A1* | 8/2020 | Larsen | H02S 10/40 |
| 2020/0254616 | A1* | 8/2020 | Ebrahimi Afrouzi | G05D 1/0016 |
| 2021/0315416 | A1 | 10/2021 | Fullmer et al. | |
| 2022/0057086 | A1* | 2/2022 | Dikshit | F28D 19/04 |

* cited by examiner

PORTABLE POWER STATION, SYSTEM, AND METHOD THEREOF

CROSS-REFERENCE TO RELATED APPLICATIONS

This application claims the benefit of U.S. Provisional Patent Application No. 63/391,705, filed Jul. 22, 2022, the disclosure of which is hereby incorporated by reference herein in its entirety.

TECHNICAL FIELD

The present invention relates generally to portable power stations and, more specifically, the present invention relates to solar powered portable power stations.

BACKGROUND

Outdoor cooking in backyards, parks, campgrounds, and parking lots has become increasingly more popular. Most outdoor cooking systems are primarily heated with propane or natural gas and many employ charcoal briquettes, lump charcoal, wood chips or pellets as the fuel for heating a grill or griddle type cooking station. Each of the above-identified types of fuel for cooking can be costly. Further, if such fuel is not readily available, the ability to cook outdoors may not be an easy option.

BRIEF SUMMARY OF THE INVENTION

The present invention is directed to various embodiments of a portable power station. In one embodiment, a solar powered portable power station configured to power an electric device and configured to be charged by multiple power sources is provided. The solar powered portable power station includes a main body, a battery bank, an inverter, a DC power inlet, an AC power inlet, and an AC power outlet. The main body includes frame components and panels extending to define a front side, a rear side, a first side and a second side each extending between a lower end and an upper end. The lower end includes wheels coupled adjacent thereto to facilitate portability of the main body. The upper end extends to define an upper support structure, the upper support structure sized and configured to position the electric device thereon. The main body includes an access member configured to access an interior space of the main body such that the access member is moveable between a closed position and an open position. The battery bank is positioned in the interior of the main body. The inverter is coupled to the battery bank and is positioned within the interior of the main body. The DC power inlet is coupled to the inverter and configured to charge the battery bank. The AC power inlet is coupled to the inverter and configured to charge the battery bank. With this arrangement, the AC power outlet is coupled to the inverter and configured to be coupled to the electric device for powering the electric device.

In another embodiment, the DC power inlet is configured to couple to a solar element for charging the battery bank. In another embodiment, the AC power inlet is configured to couple to an electrical outlet for charging the battery bank as an alternate power source. In still another embodiment, the upper support structure of the main body includes a flat surface sized and configured to position the electric device thereon, the flat surface extending between each of the front side and the rear side and extending between each of the first side and the second side of the main body.

In another embodiment, upon the access member moving to the open position, the access member facilitates access to the interior of the main body for accessing the battery bank and the inverter. In another embodiment, the battery bank includes one or more sensors and a battery status display, the one or more sensors being configured to sense a charge level of the battery bank, the charge level configured to be displayed on the battery status display. In another embodiment, the main body includes a power switch coupled to the inverter such that, upon the power switch being turned-on, the inverter is configured to convert direct current electricity into alternating current electricity. In yet another embodiment, the inverter is coupled to a controller having one or more processors, wherein the controller is configured to direct excess electricity to the battery bank for reserve.

In accordance with another embodiment of the present invention, a portable power station configured to be charged by multiple power sources is provided. The portable power station includes a main body, an electric device, a battery bank, an inverter, a DC power inlet, an AC power inlet, and an AC power outlet. The main body includes frame components and panels extending to define a front side, a rear side, a first side and a second side each extending between a lower end and an upper end of the main body. The lower end includes wheels coupled adjacent thereto to facilitate portability of the main body. The upper end extends to define an upper support structure. The main body includes an access member configured to access an interior space of the main body such that the access member is moveable between a closed position and an open position. The electric device is configured to be supported by, and positioned on, the upper support structure of the main body. The battery bank is positioned in the interior of the main body. The inverter is coupled to the battery bank and is positioned within the interior of the main body. The DC power inlet is coupled to the inverter and is configured to facilitate charging the battery bank. The AC power inlet is coupled to the inverter and is configured to facilitate charging the battery bank. The AC power outlet is coupled to the inverter and is configured to be coupled to the electric device for powering the electric device.

In another embodiment, the portable power station further includes a solar element configured to couple to the DC power inlet for charging the battery bank. In another embodiment, the AC power inlet is configured to couple to an electrical outlet as an alternate power source for charging the battery bank. In another embodiment, the upper support structure of the main body includes a flat surface sized and configured to position the electric device thereon, the flat surface extending between each of the front side and the rear side and extending between each of the first side and the second side of the main body.

In another embodiment, upon the access member moving to the open position, the access member facilitates access to the interior of the main body for accessing the battery bank and the inverter. In another embodiment, the battery bank includes one or more sensors and a battery status display, the one or more sensors being configured to sense a charge level of the battery bank, the charge level configured to be displayed on the battery status display. In another embodiment, the main body includes a power switch coupled to the inverter such that, upon the power switch being turned-on, the inverter is configured to convert direct current electricity into alternating current electricity. In still another embodiment, the inverter is coupled to a controller having one or more processors, wherein the controller is configured to direct excess electricity to the battery bank for reserve. In yet another embodiment, the electric device is an electric griddle cooking station sized and configured to be removably positioned on the upper support structure.

In accordance with another embodiment of the present invention, a method for using a portable power station is provided. The method includes the steps of: providing a main body including frame components and panels extending to define a front side, a rear side, a first side and a second side each extending between a lower end and an upper end, the lower end including wheels coupled adjacent thereto to facilitate portability of the main body, the upper end extending to define an upper support structure, the main body configured to contain a battery bank positioned within an interior of the main body and the main body configured to contain an inverter, coupled to the battery bank, and positioned within the interior of the main body; charging the battery bank with a solar element, the solar element coupled to a DC power inlet such that the DC power inlet is coupled to the inverter; and powering an electric device with a plug extending from the electric device being plugged into an AC power outlet, the AC power outlet coupled to the inverter positioned in the main body.

In another embodiment, the method further includes the step of: charging the battery bank with an alternate energy source through an AC power inlet coupled to the inverter. In another embodiment, the powering the electric device step includes the step of: cooking with an electric griddle cooking station positioned on the upper support structure of the main body.

In accordance with another embodiment of the present invention, an outdoor cooking system or method configured to be powered by a solar element or alternate energy source is provided. In one embodiment, the cooking system includes a main body, a control panel, a griddle, a heating element, and a battery bank. The main body includes a cabinet structure extending to define a front side, a rear side, a left side, a right side, a bottom side, and an upper side. Further, the main body includes a DC power inlet, an AC power inlet, and an AC power outlet thereon and an electrical heating element sized and configured to be positioned therein. The DC power inlet and the AC power inlet are sized and configured to connect to the solar element and the alternate energy source, respectively. The upper side extends to receive a hood positioned thereon, the hood being configured to be moveable from a cover position to a non-covered position. The bottom side of the main body includes wheels coupled thereon to facilitate portability of the main body. The control panel is positioned along the front side of the main body, the control panel associated with a controller configured to control the electrical heating element. The griddle is sized and configured to be positioned on the upper side of the main body such that the griddle is positioned above the heating element, the hood extending to cover the griddle upon being in the cover position. The battery bank is positioned within the cabinet structure of the main body, the battery bank coupled to the controller and configured to hold excess electricity from the solar energy source or alternate energy source.

In another embodiment, the DC power inlet and the AC power inlet are coupled to the controller such that electricity supplied by the solar energy source or alternate energy source is directed to the controller. In another embodiment, the AC power outlet is coupled to the controller, and wherein, the controller is configured to direct electricity to the AC power outlet. In another embodiment, the control panel includes an input device and an output device, the input and output devices being a touch screen display. In still another embodiment, the controller includes an input device, an output device, a processor, and a memory, the controller being configured to control the cooking system. In a further embodiment, the controller includes an inverter configured to convert direct current electricity to alternating current electricity, and wherein, the inverter is coupled to the battery bank, the AC power outlet, and a switch. In still a further embodiment, the switch is coupled to the controller and the heating element, the switch is configured to initiate the transfer of electricity to the heating element or inhibit the transfer of electricity to the heating element.

In another embodiment, the controller is coupled to the battery bank, the controller being configured to direct excess electricity to the battery bank for reserve. In a further embodiment, the battery bank is configured to supply reserved electricity to the controller when the solar energy source or alternate energy source are not connected to the DC power inlet or the AC power inlet, respectively. In another embodiment, the controller is coupled to multiple sensors, the sensors being connected to the griddle and the battery bank, the sensors being configured to sense at least one of temperature, voltage, and current.

In accordance with another embodiment of the present invention, a method of powering a cooking system and retaining electricity from a solar energy source or an alternate energy source is provided. The method includes the steps of: providing a main body extending with a cabinet structure to define a front side, a rear side, a left side, a right side, a bottom side, and an upper side such that a cabinet structure, the main body including a heating element sized and configured to be positioned therein, the upper side extending to define a hood positioned thereon, the hood being configured to be moveable from a cover position to a non-covered position, the bottom side having wheels coupled thereon to facilitate portability of the main body, the main body including a griddle positioned along the upper side of the main body positioned over an electrical heating element supported by the main body, the main body including a battery bank positioned within the cabinet structure; charging the battery bank with the solar element or the alternate energy source at a DC power inlet or an AC power inlet, respectively, the DC power inlet and the AC power inlet each operably coupled to the battery bank and positioned in a wall of the main body; and heating the electrical heating element by drawing upon power from the charged battery bank to heat the griddle.

In another embodiment, the method further includes the step of controlling the heating with a controller associated with the main body such that the controller is associated with an input device and an output device of the main body. In a further embodiment, the controlling includes the step of sensing a temperature of the griddle with one or more temperature sensors associated with the griddle. In another embodiment, the providing step includes providing an AC power outlet in the main body. In another embodiment, the charging step includes generating power from the solar element and feeding that power to the battery bank via the DC power inlet of the main body. In still another embodiment, the providing step includes providing a touch sensitive display along the front side of the main body, the touch sensitive display having a controller integrated therewith, the controller configured to control the electrical heating element.

In accordance with another embodiment of the present invention, a cooking station configured to be powered by a solar energy element or an alternate energy source is provided. The cooking station includes a main body, a control panel, an electrical heating element, a griddle, and a battery bank. The main body includes a cabinet structure extending to define a front side, a rear side, a left side, a right side, a bottom side, and an upper side. The front side is positioned generally opposite the rear side, the left side is positioned generally opposite the right side, and the bottom side is positioned generally opposite the upper side. The upper side extends to define an upper edge and a hood moveable between an open position and a closed position such that, upon the hood being in the closed position, a lower hood edge of the hood at least partially corresponds and is positioned adjacent to the upper edge of the upper side of the main body. The bottom side of the main body exhibiting wheels, the wheels coupled to the main body and facilitating portability of the main body. The control panel is positioned on the main body. The electrical heating element positioned adjacent the upper edge and supported by the main body, the electrical heating element configured to be controlled at the control panel. The griddle is supported by the main body and is positioned directly above the electrical heating element and positioned adjacent the upper edge such that the hood is moveable to the closed position to substantially be positioned over the griddle. The battery bank is positioned within the cabinet structure of the main body. With this arrangement, the battery bank is configured to store power received from the solar energy element or the alternate power source such that the battery bank is configured to be operably coupled to the electrical heating element and the control panel.

In another embodiment, the control panel includes an input device and an output device. In another embodiment, the control panel includes a touch sensitive display. In still another embodiment, the cooking statin further includes a controller, the controller associated with the control panel, the controller including an input device, an output device, a processor and a memory, the controller configured to control the electrical heating element and configured to be coupled to the battery bank.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
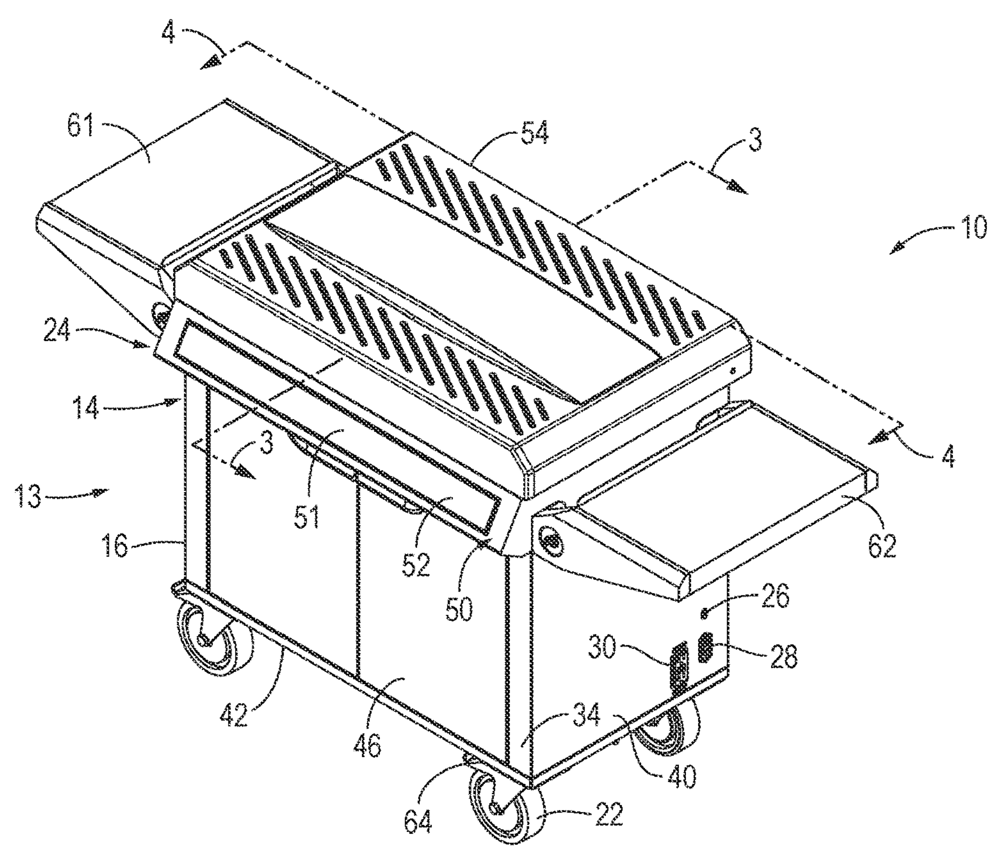
FIG. 1 is a perspective view of a cooking system, according to an embodiment of the present invention.
Figure 2:
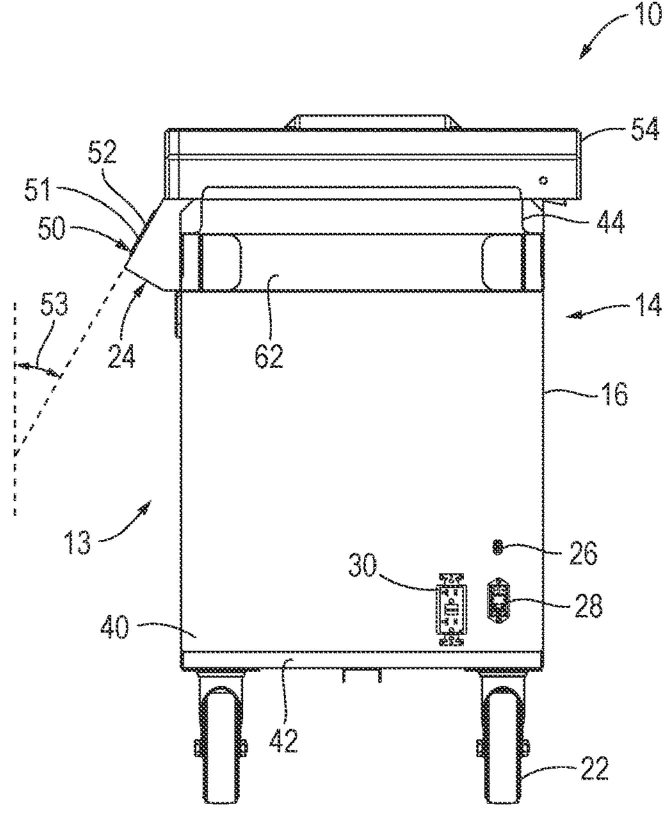
FIG. 2 is a right side view of the cooking system, according to an embodiment of the present invention.
Figure 8:
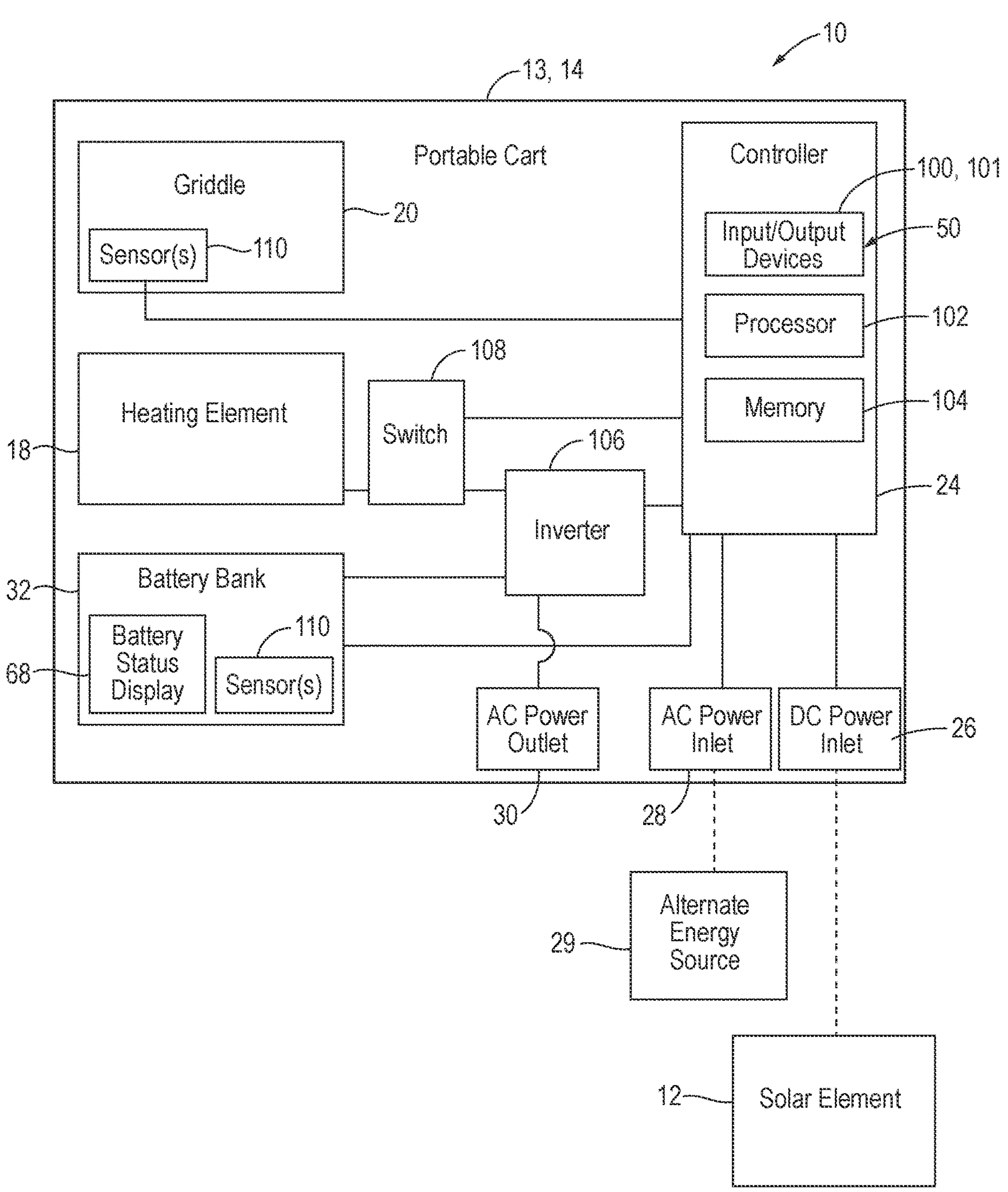
FIG. 8 is a schematic view of the cooking system, according to another embodiment of the present invention.
Figure 9:
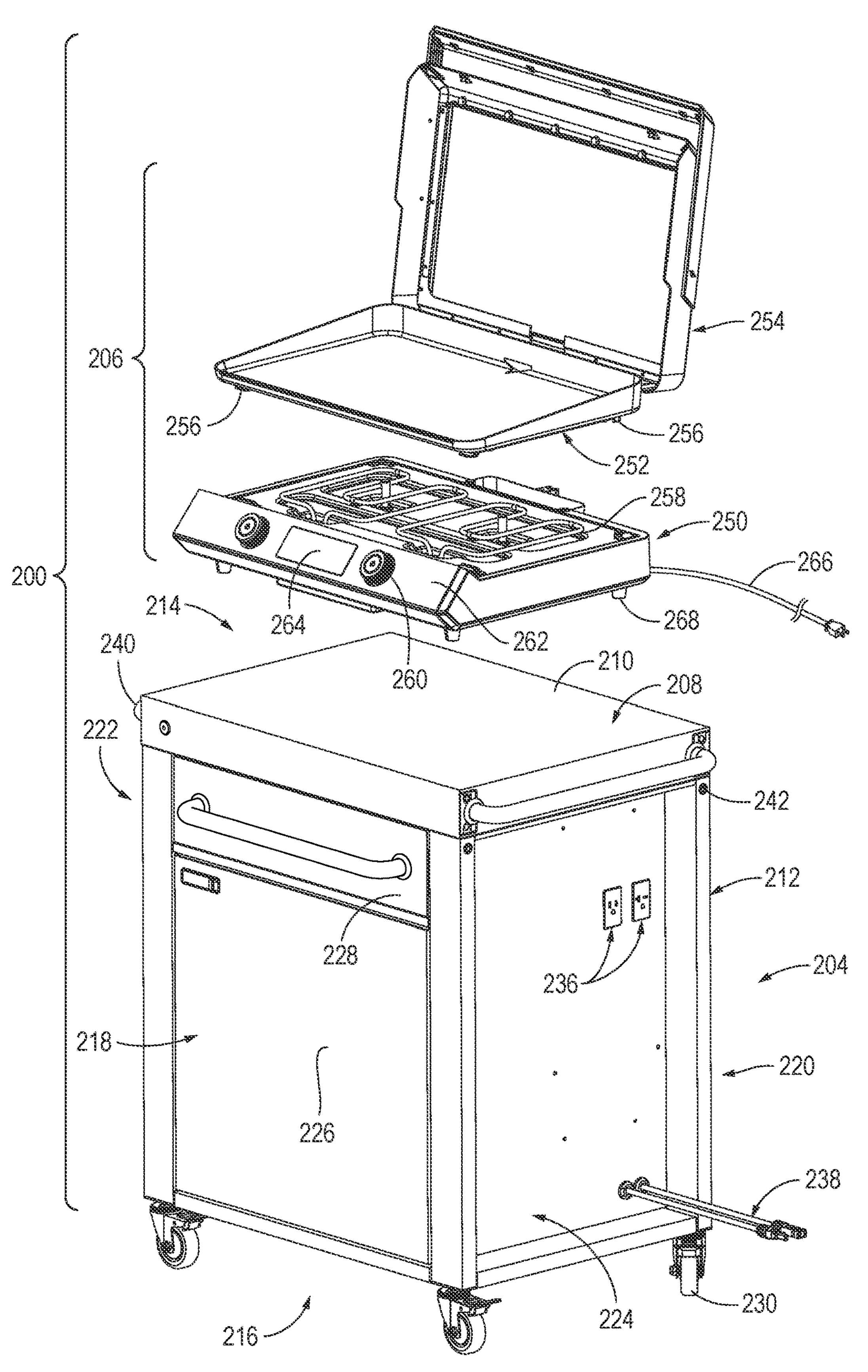
FIG. 9 is an exploded view of a portable power station associated with an electric cooking station, according to another embodiment of the present invention.
Figures 10, 11:
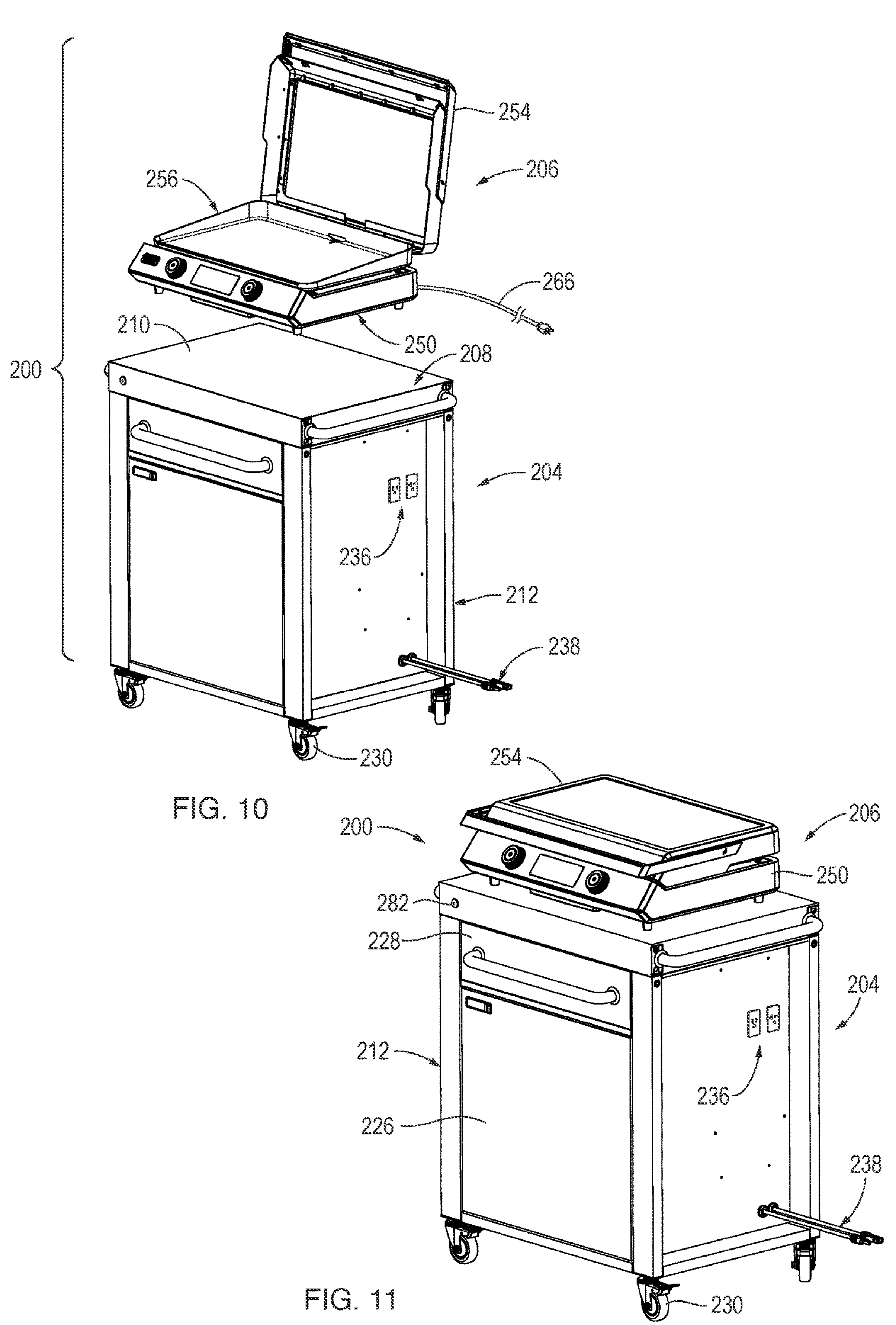
FIG. 10 is another exploded view of the portable power station associated with the electric cooking station, depicting the electric cooking station being a separate and removable component relative to the portable power station with a hood of the electric cooking station being in an open position, according to another embodiment of the present invention.
FIG. 11 is a perspective view of the electric cooking station positioned on an upper surface of the portable power station, depicting the electric cooking station positioned on the portable power station with the hood of the electric cooking station in a closed position, according to another embodiment of the present invention.
Figure 12:
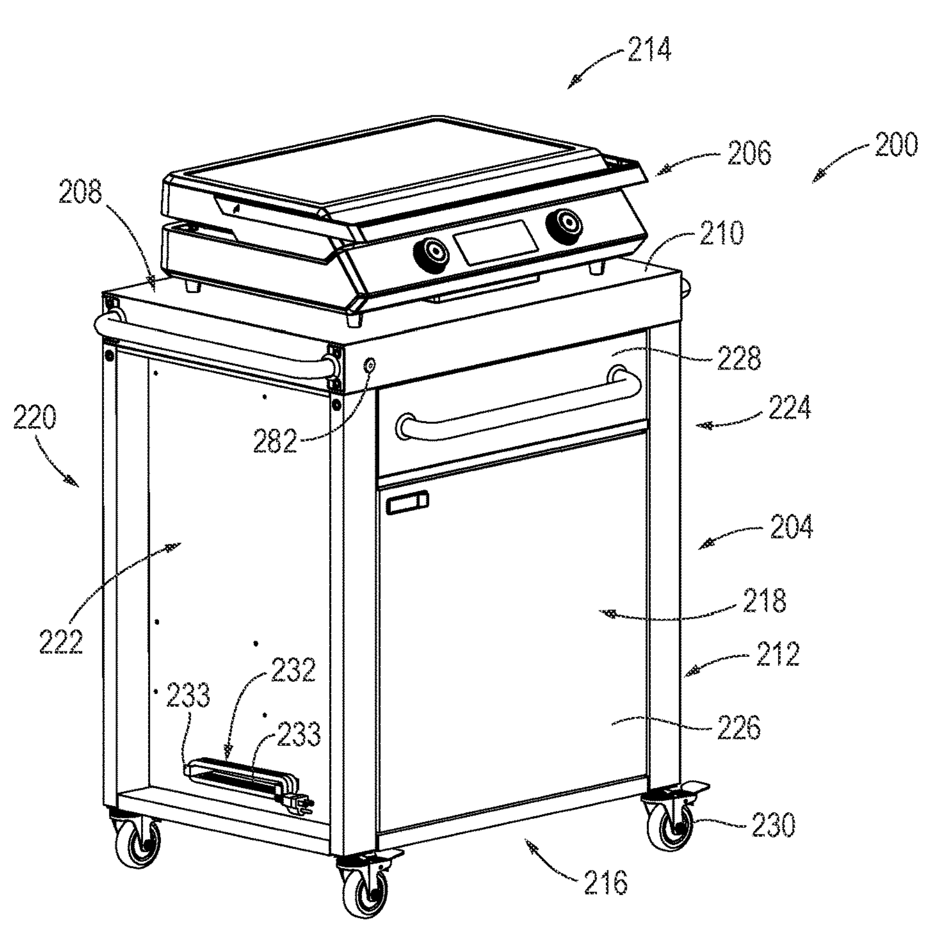
FIG. 12 is a perspective view of the portable power station associated with an electric cooking station, depicting the portable power station having an AC power inlet power cord, according to another embodiment of the present invention.
Figure 13:
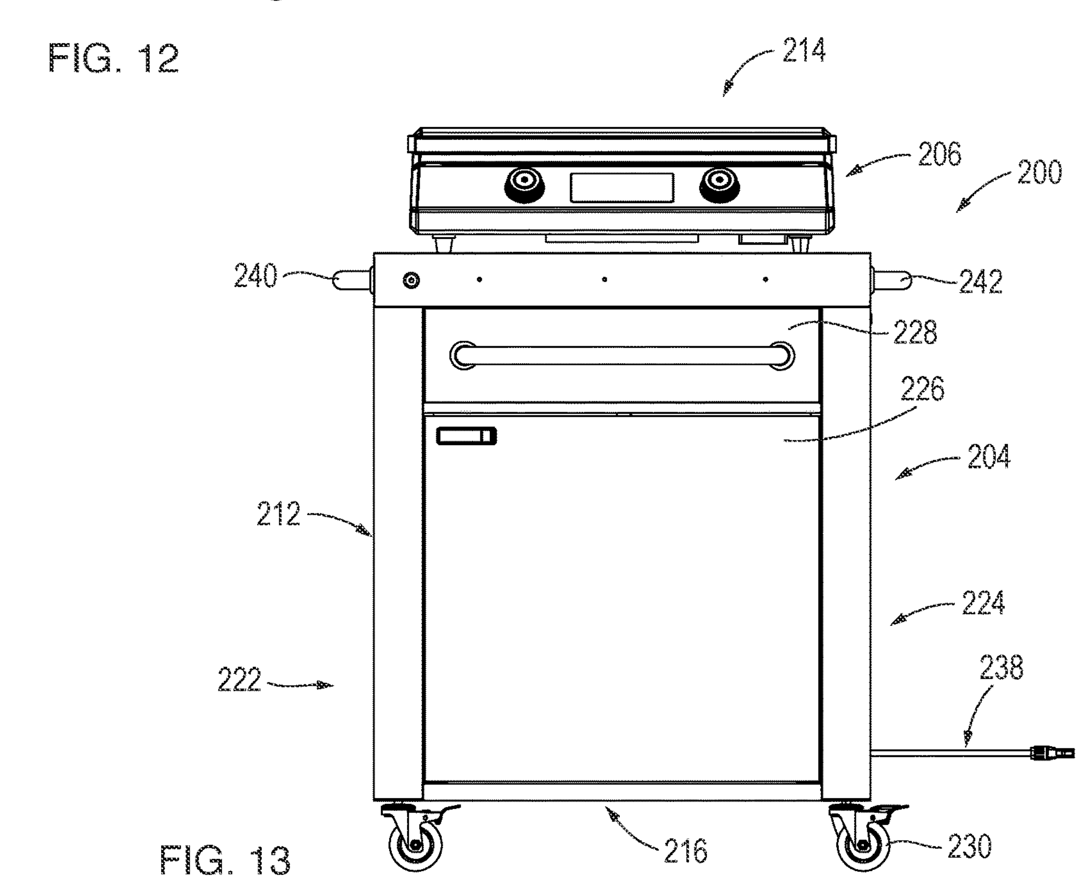
FIG. 13 is a front view of the portable power station associated with an electric cooking station, according to another embodiment of the present invention.
Figure 14:
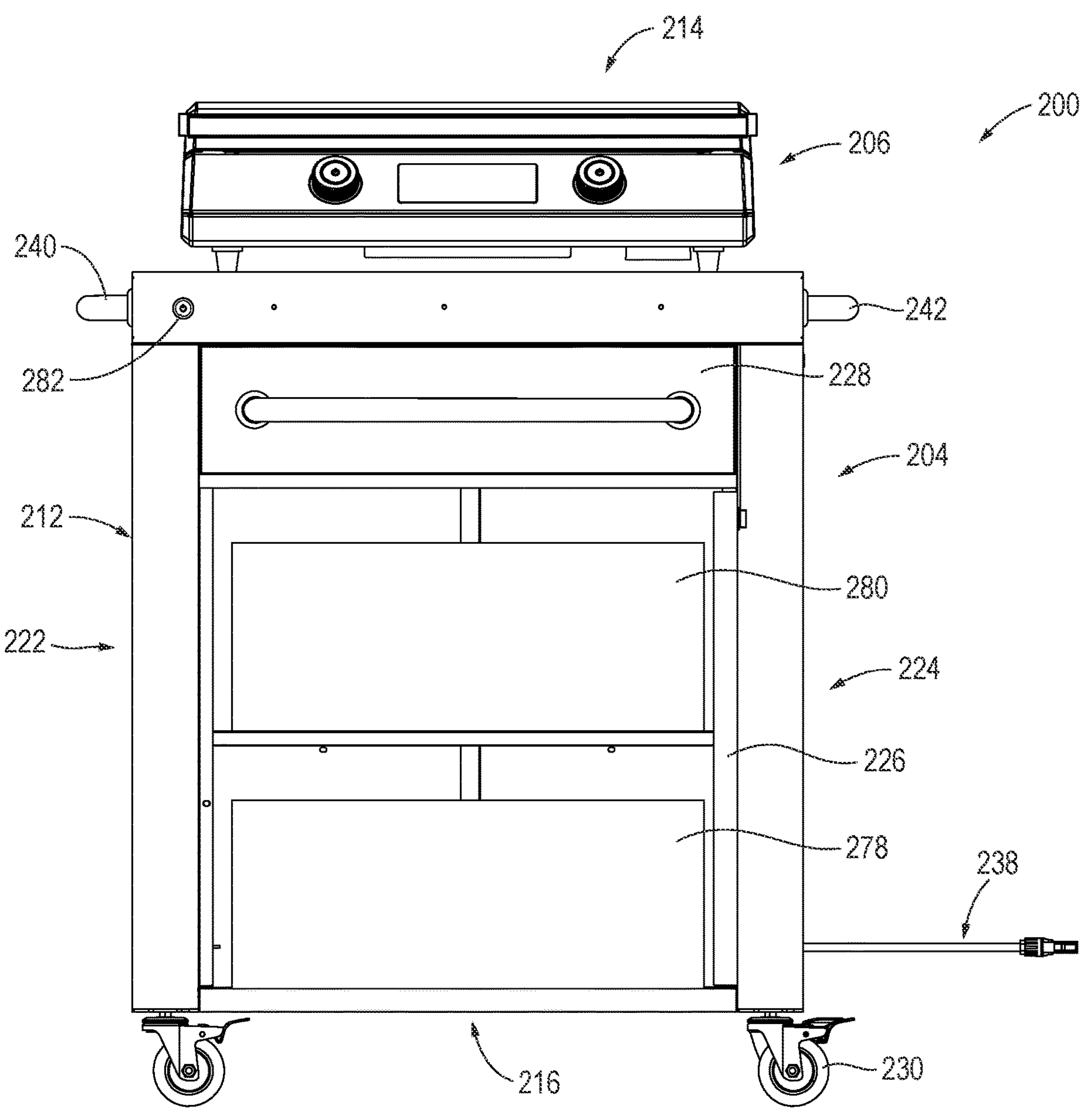
FIG. 14 is a front view of the portable power station associated with an electric cooking station, depicting the portable power station with a door in an open position to expose a battery bank and an inverter positioned within the interior of the portable power station, according to another embodiment of the present invention.

Referring to FIGS. 1, 2 and 8, a cooking system 10 or portable power station that may be configured to be electrically powered from a solar element 12 or solar energy source is provided. In one embodiment, the cooking system 10 may retain electrical power from the solar element 12 or an alternate energy source. The cooking system 10 may be sized and configured to be used outdoors with a portable feature. Further, the cooking system 10 may be referenced as a portable power station such that the portable power station may be employed for powering a cooking device or any other electric device, such as a power tool. In one embodiment, the cooking system 10 may be housed within a portable cart 13 or similar structure. Further, the portable cart of the cooking system 10 may include a main body 14 or frame structure extending to define a cabinet structure 16 or cart like structure. The main body 14 of the portable cart 14 may include a heating element 18 positioned therein such that a griddle 20 (FIG. 5) may be positioned on the main body 14 above the heating element 18. Further, the main body 14 of the portable cart may define wheels 22, such as caster wheels, positioned adjacent a lower end of the main body, the wheels 22 sized and configured to assist in facilitating portability of the main body 12. In one embodiment, the main body 14 may include a controller 24, a DC power inlet 26, an AC power inlet 28, and an AC power outlet 30. The DC power inlet 26 (or direct current power inlet) may be configured to connect to the solar element 12 or alternate energy source which provides direct current electricity. The AC power inlet 28 (or alternating current power inlet) may be configured to connect to the alternate energy source 29 which provides alternating current electricity. The controller 24 may be coupled to the DC power inlet 26 and AC power inlet 28 such that the controller 24 may be configured to be powered by the solar energy source 12 (FIG. 8) or alternate energy source when connected to the DC power inlet 26 or AC power inlet 28. The cabinet structure 16 may include a battery bank 32 or power bank (see also FIG. 3) positioned therein. The battery bank 32 may be configured to store excess electricity provided by the solar element 12 or alternate energy source 29. Further, the battery bank 32 (FIG. 3) may be coupled to the controller 24 such that the battery bank 32 (FIG. 3) may power the controller 24 if the solar energy source 12 (FIG. 8) or alternate energy source 29 is not connected. Even further, the controller 24 may be coupled to the AC power outlet 30 (or alternating current power outlet) such that electricity stored by the battery bank 32 (FIG. 3) or electricity in the controller 24 may be utilized to charge or power an external item, such as a phone, refrigerator, freezer, or other appliance.

Now with reference to FIGS. 1 and 2, as previously set forth, the cooking system may include the portable cart 13 extending with the main body 14. The main body 14 may extend to define a front side 34, a rear side 36 (FIG. 5), a left side 38 (FIG. 4), a right side 40, a bottom side 42, and an upper side 44. Further, the main body 14 may extend to define the cabinet structure 16 with various doors, drawers and/or compartments defined by the framework of the main body. For example, the front side 34 may extend to define cabinet doors 46 sized and configured to open to an interior 48 (FIG. 3) of the cabinet structure 16, the doors 46 being pivotably openable and readily able to be openable by the user. In another embodiment, the cabinet doors 46 may include a key lock or the like so that the cabinet doors 46 may be locked in a closed position and unlocked so that the doors may be pivotably opened to an open position.

Further, the front side 34 of the main body 14 may include a control panel 50 positioned above the cabinet doors 46. In one embodiment, the control panel 50 may include a panel surface 51 that may be elongated to extend between the left and right sides 38, 40 of the main body 14 along the front side 34 of the main body 14. In another embodiment, the panel surface 51 of the control panel 50 may be oriented transverse relative to a front surface of the cabinet doors 46 such that the panel surface 51 may face at an angle 53 so that the line of sight of the user standing in-front of the main body 14 may generally be facing the panel surface 51 so that the user may readily view the control panel 50. In another embodiment, the panel surface 51 may extend generally parallel relative to the cabinet doors 46 of the main body 14. In another embodiment, the panel surface 51 may extend along the front side 34 of the main body 14, but may extend generally perpendicular relative to the surface of the cabinet doors 46. In another embodiment, the panel surface 51 of the control panel 50 may be a touch screen display 52 so as to facilitate both digital and analog read-outs so as to provide relevant information of various statuses of the cooking system 10 and the components associated with the cooking system 10. The panel surface 51 of the control panel 50 may extend most of the length of the front side 34 between the left and right sides 38, 40 of the main body 14. In another embodiment, the panel surface 51 of the control panel 50 may include button pads and switches, instead of or in addition to, the touch screen display 52 to assist the user in controlling the cooking system 10.

With reference again to FIGS. 1, 2 and 8, the control panel 50 may be directly coupled to and associated with the controller 24 of the cooking system 10. The control panel 50 and controller 24 may be configured to control the cooking system 10 such that the user may input desired parameters into the control panel 50, such as to heat the heating element 18. The controller may include the necessary components, connections, and materials for implementing the input requests of the user, such as one or more processors 102 and a memory 104 that may include programming and software so that the cooking system 10 may function appropriately and carry-out the input requests of the user, as known to one of ordinary skill in the art.

With reference to FIGS. 1 and 2, the upper side 44 of the main body 14 may extend to define a hood 54. The hood 54 may rest over the griddle 20 (FIG. 5) or the hood 54 may be pivotably coupled to the main body 14 or the griddle 20. As such, the hood 54 may be configured to be moveable from a cover position to a removed or an upright position. The left side 38 (FIG. 4) or the right side 40 of the main body 14 may include the DC power inlet 26, the AC power inlet 28, and the AC power outlet 30 so as to be positioned within panels, for example, of the main body 14. Further, the left side 38 and the right side 40 of the portable cart 13 may include respective first and second side shelves 61, 62. Such first and second side shelves 61, 62 may be in a fixed position relative to the main body 14 or the first and second side shelves may be pivotably coupled to the main body 14. Such first and second side shelves may include an upward facing surface 63 that provides additional surface area to assist the user while cooking such that the user may utilize the additional surface area to place, for example, cooking utensils, spices or food thereon. The bottom side 42 of the main body 14 may include wheels 22, such as caster wheels, sized and configured to facilitate portability of the cart 13. The wheels 22 may include locks 64 sized and configured to lock the wheels 22 in place such that the position of the cooking system 10 may be maintained.

Figures 3, 4:
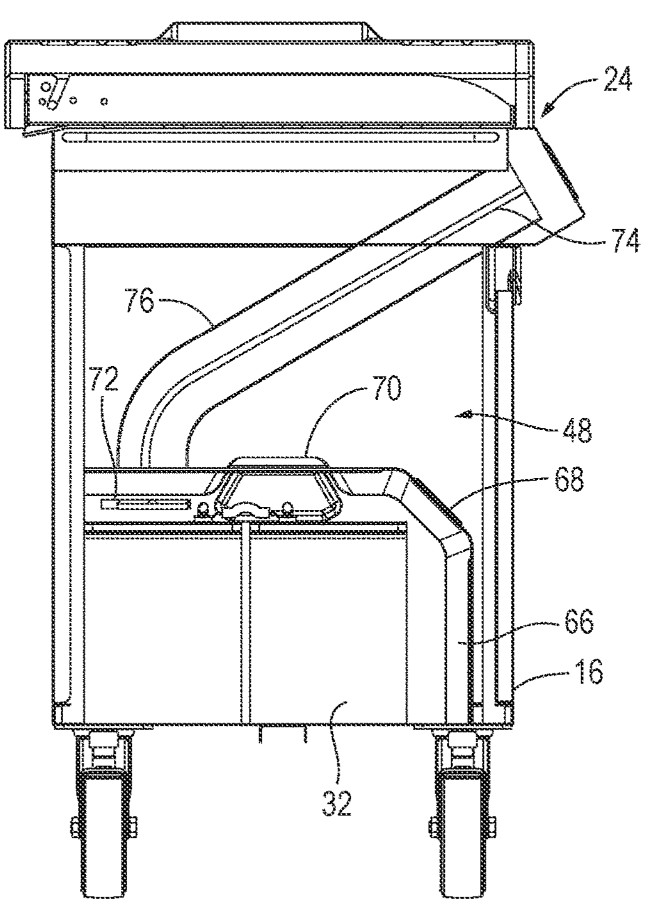
FIG. 3 is a cross-sectional view of the cooking system taken along section line 3-3 of FIG. 1, according to another embodiment of the present invention.
FIG. 4 is a cross-sectional view of the cooking system taken along section line 4-4 of FIG. 1, according to another embodiment of the present invention.

Now with reference to FIGS. 3, 4 and 8, as previously set forth the cabinet structure 16 may include the battery bank 32 located therein. The battery bank 32 may be contained within a battery bank encasement 66. The battery bank encasement 66 may surround the entirety of the battery bank 32 and be configured to protect the battery bank 32 from heat or other elements. Further, the battery bank encasement 66 may extend to define a battery status display 68. The battery status display 68 may be coupled to the battery bank 32 such that the voltage levels of the battery bank 32 may be digitally displayed. The battery bank encasement 66 may extend to define hand holds 70. The hand holds 70 may be sized and configured to allow for the battery bank encasement 66 to be lifted and/or allow access to the battery bank 32. Further, the battery bank encasement 66 may include a cable opening 72 sized and configured to allow for cables 74 or wires to enter into the battery bank encasement 66 and couple to various components of the battery bank 32, as known to one of ordinary skill in the art. In one embodiment, the cables 74 or wires may extend from the controller 24 to each of the battery bank 32, the DC power inlet 26, the AC power inlet 28, and the AC power outlet 30. Further, the cables 74 or wires may also extend from the controller 24 to the heating element 18 and to one or more sensors 110 associated with the griddle 20. The cables or wires may be protected by one or more sleeves 76, the sleeves 76 extending within the main body of the portable cart 13. For example, the one or more sleeves 76 may extend between the controller 24 and the battery bank encasement 66. Further, the one or more sleeves 76 may be sized and configured to protect the cables 74 from excessive heat and other elements which could compromise the integrity of the cables 74 or wires. Even further the one or more sleeves 76 may extend alongside either one, or both, the left side 38 or right side 40 of the main body 14 to facilitate extending to the various components of the cooking system 10, such as the DC power input 26, the AC power input 28, and AC power output 30, the battery bank 32, heating element 18 and the griddle 20.

Figures 5, 6, 7:
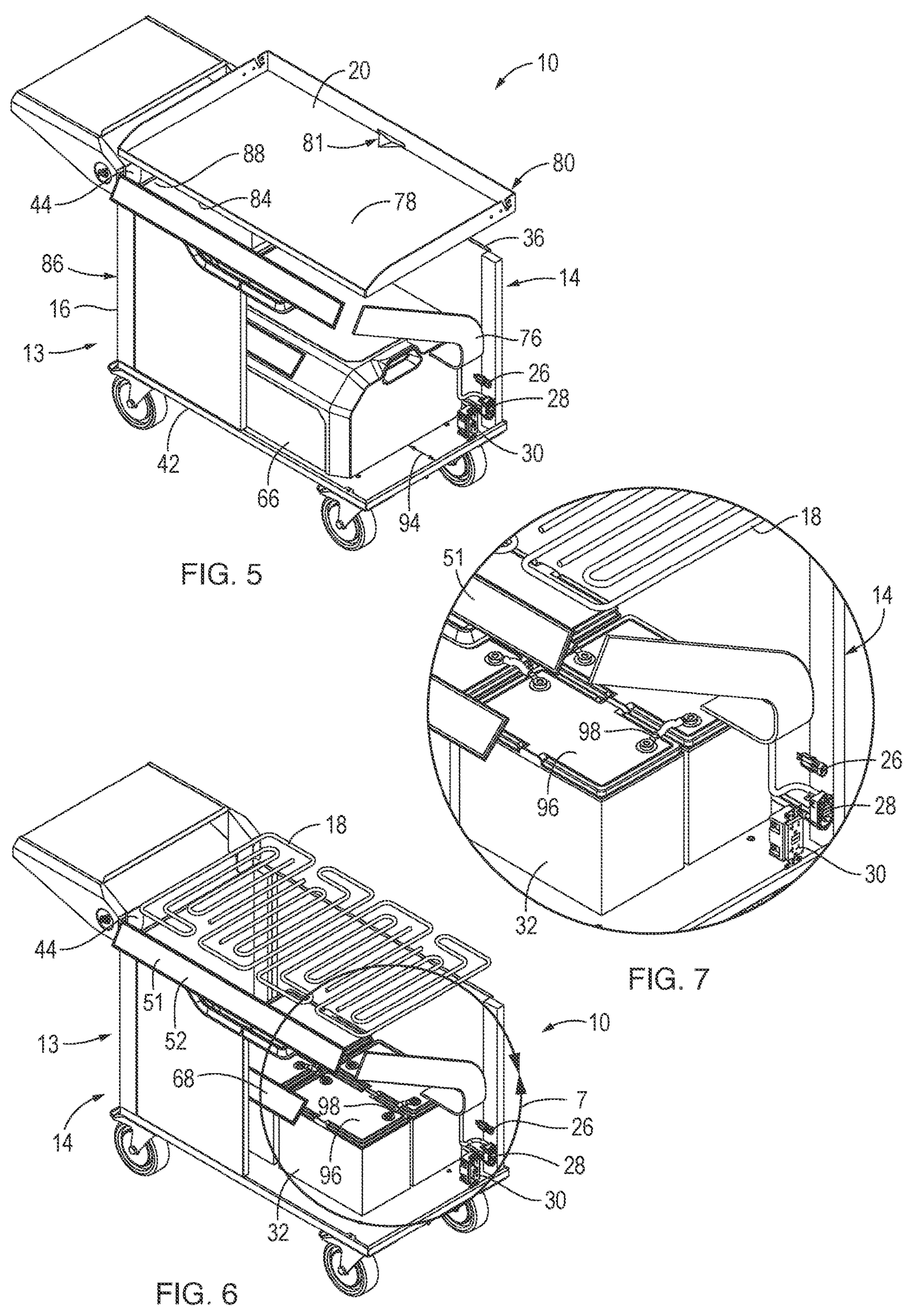
FIG. 5 is a perspective view of the cooking system with portions of the cooking system removed, according to another embodiment of the present invention.
FIG. 6 is a perspective view of the cooking system with some other portions of the cooking system removed, according to another embodiment of the present invention.
FIG. 7 is an enlarged view of the battery bank taken from region 7 of FIG. 6, according to another embodiment of the present invention.

Now with reference to FIGS. 4, 5 and 8, as previously described, the hood 54 may rotate or pivot from a cover position to an upright position. The hood 54 in the cover position may extend across or over a cooking surface 78 of the griddle 20 and around a splash guard 80 of the griddle 20 such that the griddle 20 may be substantially covered by the hood 54. Further, the hood 54 may be sized and configured to stabilize the griddle 20 to the upper side 44 of the main body 14 so that, upon transporting the cooking system 10, the griddle 20 may be safely maintained to the main body 12. The cooking surface 78 of the griddle 20 may be a flat cooking surface. Further, the griddle 20 may include an opening 81 defined therein for managing grease and food byproduct, similar to that described in commonly assigned U.S. Pat. Nos. 10,327,588 and 10,327,589, the contents of which are incorporated by reference herein in their entirety. In another embodiment, the cooking surface 78 of the cooking system 10 may extend to exhibit a grill or grates, instead of or in addition to, the griddle 20. The cabinet structure 16 may extend from the bottom side 42 of the main body 14 to a cabinet top 82. The cabinet top 82 may close off the cabinet structure 16 from the heating element 18 or upper side 44 of the main body 14 so as to define a space 84. The space 84 defined within the main body may extend from the cabinet top 82 to the upper side 44 of the main body 14. Further, the space 84 may include the heating element 18 positioned therein. The cable sleeve 76 may extend past the cabinet top 82 into the space 84 to connect to the controller 24. In another embodiment, the cabinet structure 16 may extend from the bottom side 42 to the upper side 44 of the main body 14 such that there is not a separate space 84 and the heating element 18 is positioned within the cabinet structure 16.

In one embodiment the cabinet structure 16 may include a left wall 88 and right wall 90. The left wall 88 of the cabinet structure 16 and left side 38 of the main body 14 may define a left gap 92 therebetween. Similarly, the right wall 90 of the cabinet structure 16 and right side 40 of the main body 14 may define a right gap 94 therebetween. The right gap 94 may include the housing and components of the DC power inlet 26, the AC power inlet 28, and the AC power outlet 30 positioned therein such that the DC power inlet 26, the AC power inlet 28, and the AC power outlet 30 may extend from an exterior 86 of the main body 14 and into the right gap 94. The one or more sleeves 76 may extend from the battery bank encasement 66, through the cable opening 72, into the right gap 94, and past the cabinet top 82, before connecting to the controller 24. In another embodiment, the left gap 92 may be sized to hole the DC power inlet 26, the AC power inlet 28, and the AC power outlet 30 therein such that the DC power inlet 26, the AC power inlet 28, and the AC power outlet 30 may extend from the exterior 86 of the main body 14 into the left gap 92. In a further embodiment, the left gap 92 and the right gap 94 may include any one of (or both) of the DC power inlet 26, the AC power inlet 28, and the AC power outlet 30 positioned therein. As such, the portable cart may include the DC power inlet 26, the AC power inlet 28, and the AC power outlet 30 positioned on both sides of the main body 14 with the appropriate wiring modifications, as known to one of ordinary skill in the art.

Now with reference to FIGS. 5-8, as previously described, the griddle 20 may be positioned on the upper side 44 of the main body 14 of the portable cart. The heating element 18 may be positioned below the griddle 20 in the space 84 such that the heating element 18 may be directly adjacent to the griddle 20. The heating element 18 may be coupled to the controller 24 such that the controller 24 (FIG. 3) may be configured to control the heating element 18 through the use of appropriate wiring, sensors, circuit materials, one or more processors 102 and programming therein, as known to one of ordinary skill in the art. In this manner, the controller 24 (FIG. 3) may be sized and configured to control and direct signals to initiate heating of the heating element 18. The battery bank 32 may include one or more batteries 96 or battery packs. The batteries 96 may be electrically connected through electrical cables 98 and well as connected to the controller 24. Further, the batteries may be sized and configured to work together as a unit, deliver power to the various components of the cooking system 10, and store excess energy therein for later use.

Now with reference to FIGS. 7 and 8, as previously set forth, the main body 14 of the cooking system 10 may include various structural and electrical components integrated therewith. For example, in one embodiment, the electrical components may include the DC power inlet 26, the AC power inlet 28, the AC power outlet 30, and the controller 24, the controller configured to control the electrical components of the cooking system. The DC power inlet 26 may be sized and configured to accept the solar element 12 such that the solar element 12 may provide one or more panels sized and configured to generate solar energy and transfer such solar energy as electricity or current via an electrical connection line 112 through the DC power inlet 26 to be stored in the battery bank 32 of the main body 14. The solar element 12 may include solar cells defined in panels sized and configured to convert energy from the sun into direct current electricity. The connection line 112 between the solar element 12 and the DC power inlet 26 may be removable from such DC power inlet 26 so that alternate energy sources may connect to DC power inlet 26 and be utilized to power the battery bank and power the electrical components of portable cart 13. Further, the AC power inlet 28 may be sized and configured to accept alternate energy sources, such as interconnecting to a power generator or interconnecting to an electrical outlet (of any existing power grid), to supply alternating current electricity to power the battery bank and power the electrical components of the portable cart 13. In this manner, either one or both the DC power inlet 26 and the AC power inlet 28 may be configured to allow for a variety of energy sources to connect and supply electricity to the electrical components of the portable cart 13. Further, the DC power inlet 26 and the AC power inlet 28 may connect to the controller 24 such that electricity may be directly supplied to the controller 24 or be routed through the controller before being supplied to the batter bank 32. When the solar element 12 or an alternate energy source is connected to the cooking system 10, the cooking system 10 may be powered, store energy in the batter bank, and the user may employ the cooking system 10.

As previously discussed, the controller 24 may be integrated with the control panel 50 (see also FIG. 1) which may be in the form of a touch screen display 52. In one embodiment, the touch screen display 52 of the control panel 50 may function with an input device 100 and an output device 102. The input device 100 of the touch screen display 52 may be a user input device such that the panel surface 51 may be touch sensitive to receive parameter inputs from the user, for example. The input device 100 may also include other modes for receiving input, such as input buttons or switches associated with the cooking system 10. The output device 101 may also be the touch screen display 52 such that the touch screen display may provide output data and detail viewable by the user on the display. In this manner, the touch screen display 52 may act as both the input and output devices 100, 101. As set forth herein, the output device 101 may provide information and detail in digital and analog format. Furthermore, the cooking system may include other output devices 101 or display, such as the battery status display 68 associated with the battery bank 32. The detail provided by the battery status display 68 may also be provided at the touch screen display 52 so that the user can readily understand the charged level of the batteries in the battery bank 32. In another embodiment, the controller 24 may include the input and output devices 100, 101. In another embodiment, as previously set forth, the controller 24 may also include the one or more processors 102 and one or more memory 104, which may include programming and software designed and configured to employ the cooking system, as known to one of ordinary skill in the art. In this manner, upon the cooking system receiving instructions from the user for any one of the functions of cooking system 10, the controller 24, with its one or more processors and memory 102, 104, may be designed and configured to control the various components of the cooking system, as requested by the user via the user input 100.

As previously set forth, the battery bank 32 may be configured to store electrical energy such that the battery bank may be charged so that such electrical energy may be used at a preferred time. The battery status display 68 of the battery bank 32 may be configured to indicate the level or amount of electricity or power that may be charged to the battery bank 32. Further, the battery bank 32 may be coupled to the controller 24 such that the battery bank 32 may be configured to provide power to the cooking system 10 if no other energy source is connected to the cooking system 10. As such, the battery bank 32 may be charged by the solar element 12 or an alternate energy source 29 to a level to operate the cooking system 10. Further, the controller 24 may be configured to route excess electricity received from the solar element 12 or alternate energy source connected to either the DC power inlet 26 or the AC power inlet 28 to the battery bank 32. The electricity routed from the controller 24 to the battery bank 32 may flow through an inverter 106 where the inverter 106 may be coupled to the controller 24 and the battery bank 32. The inverter 106 may be configured to convert direct current electricity into alternating current electricity. As such, the inverter 106 may convert direct current electricity provided by the battery bank 32, or provided by the solar energy source 12, or provided by another energy source connected to the DC power inlet 26 into alternating current electricity. In another embodiment, the inverter 106 may be configured to convert alternating current electricity provided by the alternate energy source connected to the AC power inlet 28 into direct current electricity. Further, the inverter 106 may be included as part of the controller 24, or the inverter 106 may be an individual piece separate but coupled to the controller 24. Even further, the inverter 106 may also be coupled to the AC power outlet 30 where the controller 24 may route electricity through the inverter 106 to convert direct current electricity to alternating current electricity before flowing to the AC power outlet 106 where an external item, such as a phone, refrigerator, freezer or other appliance may be charged or powered.

The heating element 18 may be coupled to a switch 108. The switch 108 may control the electrical current sent to the heating element 18 by either initiating or inhibiting the electrical current. Further, the switch 108 may be coupled to the controller 24 such that alternating current electricity may flow from the controller 24 and through the switch 108 to the heating element 18. In another embodiment, the switch 108 may be coupled to the controller 24 such that direct current electricity may flow from the controller 24 and through the switch 108 to the heating element 18. The switch 108 may also be coupled to the inverter 106 such that direct current electricity may flow from the controller 24, through the inverter 106 to be converted to alternating current electricity, and through the switch 108 to the heating element 18. In another embodiment, the switch 108 may be coupled to the inverter 106 such that alternating current electricity may flow from the controller 24, through the inverter 106 to be converted to direct current electricity, and through the switch 108 to the heating element 18. The switch 108 may be included in the controller 24 or may be an individual piece separate but coupled to the controller 24.

One or more sensors 110 may be positioned on the griddle 20 and/or the battery bank 32. The sensors 110 may be temperature sensors, current sensors and/or voltage sensors each configured to sense temperature, current and/or voltage, respectively, and provide that data to the controller 24. The one or more sensors associated with the griddle 20 may be temperature sensors and may be configured to detect the temperature or any temperature change of the griddle 20. Further, the temperature sensors associated with the griddle 20 may be coupled to the controller 24 and provide data to the controller 24 so that the controller can manipulate the amount of power routed to the heating element so that the griddle may be heated to the parameter requested by the user at the control panel 50 or input device 100. The controller 24 may be configured to display the temperature sensed by the temperature sensors through the output device 101 on the touch screen display 52 of the control panel 50 (FIG. 1). As previously set forth, one or more sensors 110 may be associated with the battery bank 32. For example, the one or more sensors 110 associated with the battery bank 32 may be temperature sensors, current sensors and voltage sensors. The temperature sensors at the battery bank 32 may sense a temperature of the batteries at the battery bank 32 to determine, for example, if there is over-heating or if the battery bank is within an appropriate temperature range. The current sensors and/or voltage sensors may be positioned and coupled to the battery bank 32. Further, the current sensors and/or voltage sensors may also be coupled to the controller 24. The sensors may be configured to sense current and/or voltage and provide that data to the controller 24. The current and/or voltage sensors may be configured to detect the incoming and outgoing electrical current relative to the battery bank 32, and the charged level of the battery bank 32. In some embodiments, the controller 24 may convert the information about the electrical current to information on voltage. Similarly, the controller may convert data about voltage to current. The voltage sensors may be configured to monitor and detect changes in voltage and determine potential problems. The current sensors and voltage sensors may be configured to send the gathered information to the output device 101 of the controller 24 such that the pertinent information may be displayed on the touch screen display 52 of the control panel 50. In this manner, the current sensors and the voltage sensors may detect and gather information for incoming electrical current and voltage and outgoing electrical current and voltage, as well as the charged levels of the battery bank 32 so that the user can readily determine the power levels for employing the cooking system 10.

Now with reference to FIGS. 9-14, another embodiment of a portable power station 200 that may be powered by a solar element 202 (FIG. 15) or other energy source, such as a battery, is provided. In this embodiment, the portable power station 200 may include a portable cart 204 that may power an electric device, such as an electric griddle cooking station 206, the electric griddle cooking station 206 configured to be removable relative to the portable cart 204. Further, the portable cart 204 may include an upper support structure 208 that may be sized and configured to support the electric griddle cooking station 206 to be positioned on the portable cart 204. In one embodiment, the upper support structure 208 may be a flat surface 210 or working surface extending along an upper side 214 of the portable cart 204. The working surface or upper support structure 208 may be a surface to position an electric device, such as the electric griddle cooking station 206, or other electric cooking station, or any other electric device, such as a power tool. Further, the upper support structure 208 may be sized and configured to hold other components in addition to, or instead of, the electric griddle cooking station 206, such as being a surface to conduct work upon or a preparation surface, for example.

The portable cart 204 may extend to define a main body 212 with panels and frame structure such that the panels may be coupled to the frame structure to form the main body 212 of the portable cart 204. The main body 212 may extend to define the upper side 214 and a bottom side 216, a front side 218 and a rear side 220, and a first side 222 and a second side 224. Each of such sides may include frame structure and panels to form the main body 212. The upper side 214 may be oppositely positioned relative to the bottom side 216 such that outer and inner surfaces of the panels may extend substantially parallel relative to each other. Similarly, the front side 218 may be oppositely positioned relative to the rear side 220 with inner and outer surfaces of the panels extending substantially parallel relative to each other. Also, the first and second sides 222, 224 may be oppositely positioned relative to each other with panels having inner and outer surfaces extending substantially parallel relative to each other. The front side 218 may extend to define a cabinet structure with one or more doors 226 that may pivotably couple adjacent the first and second sides 222, 224 of the main body 212. The one or more doors 226 may be referenced as an access member that may be movable between open and closed positions for accessing or closing-off an interior of the main body 212, respectively. Further, the front side 218 may include one or more drawers 228, such as adjacent the upper side 214 and accessible along the front side 218 of the main body 212, the one or more drawers 226 sized and configured to contain cooking tools or anything desired by the user. Furthermore, the bottom side 216 of the main body 212 may include multiple caster wheels 230 or the like that may be coupled to the bottom side 216 and may readily facilitate the portability of the main body 212.

Figure 15:
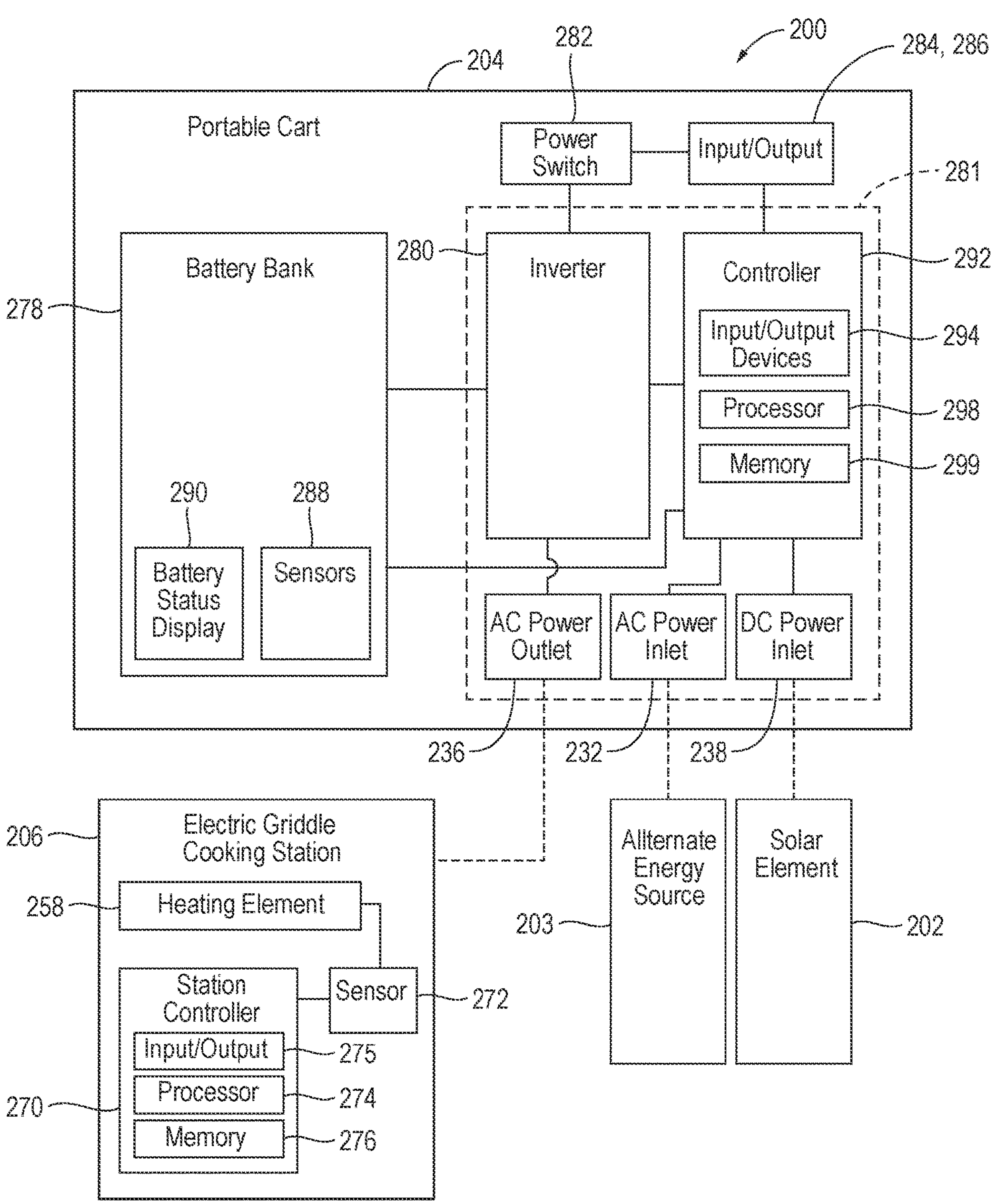
FIG. 15 is a schematic of the portable power station associated with an electric cooking station, depicting the portable power station being powered with a solar element and/or an alternate energy source, according to another embodiment of the present invention.

In one embodiment, the first and second sides 222, 224 (or any other side of the main body 212) may include various electrical connectors and/or outlets. For example, the first side 222 of the main body 212 may include an AC power inlet 232 in the form of a power cord 233. The first side 222 of the main body 212 may include wrapping structure 234, such as bracket type structure, for managing the cord 233 while not in use so that the power cord 233 may be managed and contained. Further, the second side 224 of the main body 212 may include one or more AC power outlets 236 positioned therewith, such as power outlets that may be rated for 120 volts and/or 240 volt type AC power outlets. The second side 224 of the main body 212 may also include a DC power inlet 238 that may be in the form of specially adapted cords that may be employed for coupling to cords of the solar element 202 (FIG. 15). Further, the first and second sides 222, 224 of the main body 212 may include first and second handles 240, 242 that may be positioned adjacent the upper side 214 of the main body 212.

With reference to FIGS. 9-11 and 15, as previously set forth, the upper side 214 of the main body 212 may include the upper support structure 208, that may be in the form of a flat surface 210, and that may be sized and configured to position the electric griddle cooking station 206 thereon. Such electric griddle cooking station 206 may be free-standing on the upper support structure 208 such that the electric griddle cooking station 206 may be readily removed and re-positioned on the upper support structure 208 of the main body 212. The electric griddle cooking station 206 may include a base 250, a griddle 252 and a hood 254. The hood 254 may be pivotably coupled to the griddle 252 and/or base 250. Further, in some embodiments, the hood 254 may be removably coupled to the griddle 252 and/or the base 250. The griddle 252 may be positioned on the base 250 such that the griddle 252 may include feet structure 256 that may correspond with receiving structure on the base 250 so that the griddle 252 may be appropriately centered and positioned on the base 250 in a consistent manner. The base 250 may also include one or more heating elements 258, such as two heating elements, that correspond with one or more knobs 260 along a front panel 262 of the base 250. The front panel 262 may also include a display 264 to provide heating information of the one or more heating elements 258 and the temperature of the griddle 252. The base 250 may also include an electric power cord 266 that may be plugged into the one or more AC power outlets 236 of the portable cart 204. The base 250 may also include base feet 268 that may be positioned directly on the upper support structure 208 of the portable cart 204 that may suspend the electric griddle cooking station 206 above the upper support structure 208. In addition, the electric griddle cooking station 206 may include the one or more heating elements 258 coupled to a station controller 270 integrated with the electric griddle cooking station 206. Further, the one or more heating elements 258 may be associated with one or more sensors 272 for sensing a temperature of the griddle 252. Such station controller 270 may include one or more processors 274, memory 276 and an input/output device 275. Such input/output device 275 may include the display 264 of the electric griddle cooking station 206. The electric griddle cooking station 206 may include various mechanical and electrical components integrated therewith to facilitate the electric griddle cooking station 206 to appropriately operate, as known to one of ordinary skill in the art.

Now with reference to FIGS. 11, 12, 14 and 15, the portable cart may be employed for powering various electric devices, such as cooking appliances made to be indoor and outdoor cooking appliances, and/or power tools, or any other appropriately sized electrically powered appliance or tool, or the like. In one embodiment, the portable cart 204 may include a battery bank 278 and an inverter 280 which may be accessed by opening the one or more doors 226 along the front side 218 of the portable cart 204. The battery bank 278 may be positioned on a shelf within the interior of the portable cart 204 and the inverter 280 may be positioned on another shelf or on brackets such that the inverter 280 may be positioned above the battery bank 278, with an airway between the battery bank 278 and the inverter 280. Further, the portable cart 204 may include a power switch 282 for turning on the power for the inverter 280 so the inverter 280 may be employed with the portable cart 204. Such power switch 282 may be positioned along the front side 218 of the main body 212, for example. In addition, the portable cart 204 may include a cart input device 284 and/or cart output device 286. The cart input and/or output device 284, 286 may be a display, such as a touch sensitive display, associated with the components of the portable cart 204 and the power switch 282. In another embodiment, the cart input and/or output device 284, 286 may be the power switch 282 that illuminates when turned on, for example. The battery bank 278 may include multiple rechargeable batteries electrically coupled together. The battery bank 278 may also include one or more sensors 288 and a battery status display 290 to assist the user in determining the amount of charge currently held by the one or more batteries in the battery bank 278. Such battery status detail may also be displayed with the cart output device 286 of the portable cart 204.

As set forth, the portable cart 204 may include the inverter 280. The inverter 280 may be coupled to a controller 292. The controller 292 may include an input device 294 and/or an output device 296, one or more processors 298, and memory 299, each of which may be integrated into the inverter 280. The inverter 280 and the controller 292 may be coupled to the battery bank 278. Further, the controller 292 may be directly coupled to AC power inlet 232 and the DC power inlet 238. The controller 292 may also be coupled to the battery bank 278. Further, the inverter 280 may be coupled to the AC power outlet 236. As in the previous embodiment, the inverter 280 may be configured to convert direct current electricity into alternating current electricity. In another embodiment, the inverter 280 may be configured to convert alternating current electricity into direction current electricity. As such, the inverter 280 may convert direct current electricity provided by the battery bank 278, or provided by the solar element 202, or provided by another energy source connected to the DC power inlet 238, into alternating current electricity. In another embodiment, the inverter 280 may be configured to convert alternating current electricity provided by an alternate energy source 203 connected to the AC power inlet 232 into direct current electricity. Further, the inverter 280 may include many of the components of the portable cart 204, such as the components encompassed within dashed line 281 (see FIG. 15). As such, the inverter 280 itself may include each of the controller 292, as well as the AC power inlet 232, the AC power outlet 236 and the DC power inlet 238. Such inverter 280 may also be coupled to the AC power outlet 236 where the controller 24 may route electricity through the inverter 280 to convert direct current electricity to alternating current electricity before flowing to the AC power outlet where an external item, such as a phone, refrigerator, freezer or other appliance may be charged or powered, for example.

The AC power outlet 236 may be employed for providing power, via the battery bank 278, to an electric device, such as the electric griddle cooking station 206, or a power tool or any other type of electric device. Such electric griddle or other type of electric device may be positioned on the upper support structure 208 of the portable cart 204 for electrically coupling to the AC power outlet 236 of the portable cart 204. In another embodiment, the portable cart 204 may be moved, via its portability, adjacent to the other type of electric unit for electrically coupling the portable cart 204 to the electric unit (not shown) via the AC power outlet 236 of the portable cart 204. In some embodiments, the portable cart 204 may be employed with an extension type power cord for coupling to an electric unit, such as a cooking appliance or power tool, for example. In this manner, the battery bank 278 of the portable cart 204 may be employed for powering various electric devices, such as an electric griddle or power tool or any other electric device.

The battery bank 278 may be recharged by the solar element 202, similar to the previous embodiment, via the DC power inlet 238. The solar element 202 may be a portable type solar element or the solar element 202 may be the type that may be fixed to a roof top of a house or garage. Such solar element 202 may include various known components associated therewith and may be sized and configured to power the battery bank 278 of the type that may provide enough power to power an electric device, such as an electric griddle or electric tool, as known to one of ordinary skill in the art. The solar element 202 may include cords that may extend to a location that the portable cart 204 may be moved for coupling to the cords of the DC power inlet 238 of the portable cart 204 so that the solar element 202 may take solar energy and charge the rechargeable batteries of the battery bank 278. Such solar element 202 may include typical components to capture solar energy and transfer the solar energy to direct current electricity to flow through the inverter 280 and then to the battery bank 278. Further, in another embodiment, the portable cart 204 may include an AC power inlet 232 with a power cord that may be plugged into a typical outlet, such as the alternate energy source 203. As such, the AC power inlet 232 of the portable cart 204 may be employed for recharging the battery bank 278, upon the solar element 202 not being a viable option, or as desired by the user.

The various structural components of the embodiments of the cooking system 10 or the portable power station 200 and the electrical components set forth herein may be formed from metallic materials, such as stainless steel, aluminum, copper, or any other suitable metallic material, or some components may be formed from one or more polymeric materials, such as the cable sleeve, battery bank encasement, battery bank, or controller, as well as any other materials needed to form and manufacture the various components of the cooking system, as known by one of ordinary skill in the art. Further, the structural components of the cooking system or portable power station and electrical components thereof may be formed by employing known manufacturing techniques and processes, such as welding, molding, milling, drilling, bending, fastening, soldering, etc., as known to one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A solar powered portable power station configured to power an electric device and configured to be charged by multiple power sources, comprising:

a cart structure including frame components and panels extending to define walls so as to extend with a front side, a rear side, a first side and a second side each extending between a lower end and an upper end to define the cart structure, the lower end of the cart structure including two wheels coupled adjacent the front side and another two wheels coupled adjacent the rear side to facilitate portability of the cart structure, the upper end of at least some of the walls extending adjacent to an upper flat support structure, the upper flat support structure being an upper most flat surface of the cart structure and being fixed relative to the walls of the cart structure, the upper flat support structure sized and configured to position the electric device thereon, the cart structure including a door configured to access an interior space of the cart structure such that the door is moveable between a closed position and an open position, the cart structure including a drawer configured to be positioned directly below the upper flat support structure and between the walls of the first and second sides such that the drawer is supported by the frame components of the cart structure;

a battery bank positioned in the interior space of the cart structure;

an inverter, coupled to the battery bank, and positioned within the interior space of the cart structure;

a DC power inlet directly coupled to one of walls of the cart structure and the inverter and configured to charge the battery bank;

an AC power inlet directly coupled to one of the walls of the cart structure and the inverter and configured to charge the battery bank; and an AC power outlet directly coupled to one of the walls of the cart structure and the inverter and configured to be coupled to the electric device for powering the electric device.

2. The solar powered portable power station of claim 1, wherein the DC power inlet is configured to couple to a solar element for charging the battery bank.

3. The solar powered portable power station of claim 1, wherein the AC power inlet is configured to couple to an electrical outlet for charging the battery bank as an alternate power source.

4. The solar powered portable power station of claim 1, wherein the upper flat support structure of the cart structure comprises a flat surface sized and configured to position the electric device thereon, the flat surface extending between each of the front side and the rear side and extending between each of the first side and the second side.

5. The solar powered portable power station of claim 1, wherein, upon the door moving to the open position, the door facilitates access to the interior of the cart structure for accessing the battery bank and the inverter.

6. The solar powered portable power station of claim 1, wherein the battery bank comprises one or more sensors and a battery status display, the one or more sensors being configured to sense a charge level of the battery bank, the charge level configured to be displayed on the battery status display.

7. The solar powered portable power station of claim 1, wherein the cart structure includes a power switch coupled to the inverter such that, upon the power switch being turned-on, the inverter is configured to convert direct current electricity into alternating current electricity.

8. The solar powered portable power station of claim 1, wherein the inverter is coupled to a controller having one or more processors, wherein the controller is configured to direct excess electricity to the battery bank for reserve.

9. A portable power station configured to be charged by multiple power sources, comprising:

a cart structure including frame components and panels extending to define walls so as to extend and define a front side, a rear side, a first side and a second side each extending between a lower end and an upper end, the lower end including two wheels coupled adjacent the front side and another two wheels coupled adjacent the rear side to facilitate portability of the cart structure, the upper end of at least some of the walls extending adjacent to an upper flat support structure, the upper flat support structure being an upper most flat surface of the cart structure and being fixed relative to the walls of the cart structure, the cart structure including a door configured to access an interior space the cart structure such that the door is moveable between a closed position and an open position, the cart structure including a drawer configured to be positioned directly below the upper flat support structure and between the walls of the first and second sides such that the drawer is supported by the frame components of the cart structure;

an electric device configured to be supported by, and positioned on, the upper flat support structure of the cart structure;

a battery bank positioned in the interior space of the cart structure;

an inverter, coupled to the battery bank, and positioned within the interior space of the cart structure;

a DC power inlet directly coupled to one of the walls of the cart structure and the inverter and configured to facilitate charging the battery bank;

an AC power inlet directly coupled to one of the walls of the cart structure and the inverter and configured to facilitate charging the battery bank; and an AC power outlet directly coupled to one of the walls of the cart structure and the inverter and configured to be coupled to the electric device for powering the electric device.

10. The portable power station of claim 9, further comprising a solar element configured to couple to the DC power inlet for charging the battery bank.

11. The portable power station of claim 9, wherein the AC power inlet is configured to couple to an electrical outlet as an alternate power source for charging the battery bank.

12. The portable power station of claim 9, wherein the upper flat support structure of the cart structure comprises a flat surface sized and configured to position the electric device thereon, the flat surface extending between each of the front side and the rear side and extending between each of the first side and the second side of the cart structure.

13. The portable power station of claim 9, wherein, upon the door moving to the open position, the door facilitates access to the interior of the cart structure for accessing the battery bank and the inverter.

14. The portable power station of claim 9, wherein the battery bank comprises one or more sensors and a battery status display, the one or more sensors being configured to sense a charge level of the battery bank, the charge level configured to be displayed on the battery status display.

15. The portable power station of claim 9, wherein the cart structure includes a power switch coupled to the inverter such that, upon the power switch being turned-on, the inverter is configured to convert direct current electricity into alternating current electricity.

16. The portable power station of claim 9, wherein the inverter is coupled to a controller having one or more processors, wherein the controller is configured to direct excess electricity to the battery bank for reserve.

17. The portable power station of claim 9, wherein the electric device is an electric griddle cooking station sized and configured to be removably positioned on the upper support structure.

18. A method for using a portable power station, the method comprising:

providing a cart structure including frame components and panels extending to define walls so as to extend and define a front side, a rear side, a first side and a second side each extending between a lower end and an upper end, the lower end including wheels coupled adjacent thereto to facilitate portability of the cart structure, the upper end of at least some of the walls extending adjacent to an upper flat support structure, the upper flat support structure being an upper most flat surface of the cart structure and being fixed relative to the walls of the cart structure, the cart structure including a drawer configured to be positioned below the upper flat support structure and between the walls of the first and second sides, the cart structure configured to contain a battery bank positioned within an interior of the cart structure and the cart structure configured to contain an inverter, coupled to the battery bank, and positioned within the interior of the cart structure;

charging the battery bank with a solar element, the solar element coupled to a DC power inlet such that the DC power inlet is directly coupled to one of the walls of the cart structure and the inverter; and powering an electric device with a plug extending from the electric device being plugged into an AC power outlet, the AC power outlet directly coupled to one of the walls of the cart structure and the inverter positioned in the cart structure.

19. The method according to claim 18, further comprising charging the battery bank with an alternate energy source through an AC power inlet coupled to the inverter.

20. The method according to claim 18, wherein the powering the electric device comprises cooking with an electric griddle cooking station positioned on the upper support structure of the cart structure.

* * * * *